United States Patent [19]

Morishita et al.

[11] Patent Number: 4,782,907

[45] Date of Patent: Nov. 8, 1988

[54] MOTOR-DRIVEN POWER STEERING SYSTEM FOR FRONT AND REAR ROAD WHEELS

[75] Inventors: Mitsuharu Morishita; Shinichi Kohge, both of Himeji, Japan

[73] Assignee: Mitsubishi Denki Kabushiki Kaisha, Japan

[21] Appl. No.: 40,814

[22] Filed: Apr. 21, 1987

[30] Foreign Application Priority Data

Apr. 22, 1986 [JP] Japan .................................. 61-95127

[51] Int. Cl.⁴ .............................................. B62D 5/04
[52] U.S. Cl. .................................... 180/140; 180/142; 188/161
[58] Field of Search ............ 180/140, 141, 142, 79.1, 180/271; 280/91; 188/161, 162, 163, 151 A; 318/301, 302, 326, 560, 563

[56] References Cited

U.S. PATENT DOCUMENTS 3,338,349  8/1967  Klinkenberg ..................... 188/161
4,228,874 10/1980  Brinkmann et al. ............... 188/163
4,669,744  6/1987  Sano ................................. 180/140
4,671,523  6/1987  Naumann .......................... 280/91

FOREIGN PATENT DOCUMENTS 143769  8/1984  Japan ..................................... 280/91
227565 12/1984  Japan ................................... 180/140
 67274  4/1985  Japan ................................... 180/140
 66581  4/1985  Japan .

Primary Examiner—John J. Love
Assistant Examiner—Everett G. Diederiks, Jr.
Attorney, Agent, or Firm—Leydig, Voit & Mayer

[57] ABSTRACT

A motor-driven power steering system for front and rear road wheels which is capable of preventing uncontrolled steering resulting from abnormal movement of the rear road wheels in case of a failure in various sensors and/or an electric motor or breakage in the wiring, and enabling vehicle to continuously travel in a safe manner by means of front wheel steering alone after occurrence of such troubles.

4 Claims, 2 Drawing Sheets

MOTOR-DRIVEN POWER STEERING SYSTEM FOR FRONT AND REAR ROAD WHEELS

BACKGROUND OF THE INVENTION

1. Field of the Invention

The present invention relates to a motor-driven power steering system adapted to power steer the rear road wheels in combination with a steering motion exerted on the front road wheels, and more particularly, to such a power steering system having a fail-safe mechanism for locking the steering motion of the rear road wheels upon failure of the power steering system.

2. Description of the Prior Art

In a conventional power steering system for front and rear road wheels, there is generally provided a closed loop control in which an appropriate steering angle is directed to the rear road wheels on the basis of the output signals of a steering-wheel sensor and/or a vehicle-speed sensor. The actual steering speed and the actual steering angle of the rear road wheels are then detected and fed back by appropriate means so as to detect a difference between the directed steering angle and the actual steering angle of the rear road wheels. On the basis of this difference, an appropriate level of voltage to be imposed on an electric motor is determined by appropriate arithmetic operations.

The conventional motor-driven power steering system for front and rear road wheels as constructed above has the following disadvantages. Specifically, in order to carry out suitable steering control on the rear road wheels, various sensors such as a vehicle speed sensor, a steering angle sensor, and the like are required. These sensors are mounted at various portions of a vehicle over a relatively broad area and electrically connected with each other or with appropriate control elements through wiring. Accordingly, if one of the sensors has failed or the wiring is cut or broken, undesirable situations, such as uncontrollable steering of the rear road wheels irrespective of the driver's intention, may result. Also, in cases where the electric motor has failed due to breakage or other trouble in the supplying power line, it is hazardous to allow the rear road wheels to move freely irrespective of the steering of the front road wheels.

SUMMARY OF THE INVENTION

In view of the above, an object of the present invention is to provide a motor-driven power steering system for front and rear road wheels capable of preventing uncontrollable steering resulting from abnormal movement of rear road wheels in case of failure in the various sensors and/or the electric motor or wiring breaks, and enabling the vehicle to continuously travel in a safe manner by means of front wheel steering alone after occurrence of such troubles.

In order to achieve the above object, according to the present invention, there is provided a motor-driven power steering system for front and rear road wheels of a vehicle adapted to steer the rear road wheels in response to the steering conditions of the front road wheels, the power steering system comprising:

a motor electrically connected with an electric power source and mechanically connected with the rear road wheels for steering thereof;

a steering condition sensor for detecting at least one of steering conditions of a steering wheel such as the direction, the steering angle, the steering torque and the steering speed of the steering wheel;

a vehicle speed sensor for detecting the travelling speed of the vehicle;

a motor rotation sensor for detecting the rotational direction and the rotational speed of the motor;

a rear-wheel steering angle sensor for detecting the steering angle of the rear road wheels;

an electromagnetic brake for braking the operation of the motor so as to lock the steering motion of the rear road wheels when the electric power supply to the electromagnetic brake is off; and a control unit receiving the output signals of the respective sensors and controlling the electric power supply from the electric power source to the motor and the electromagnetic brake to lock the rear wheels and provide fail-safe operation, allowing steering of the vehicle through the front wheels, responsive to a failure of any one of the sensors or electrical connections of the system.

The control unit comprises:

a fail-safe relay inserted in a power line for electrically connecting the electric power source with the motor and the electromagnetic brake and adapted to establish, when switched on, the electrical connections therebetween, and interrupt the electrical connections when switched off;

a fail-safe-relay driving circuit adapted to switch the fail-safe relay on or off in a manner such that the fail-safe relay is switched on to supply electric power to the motor and the brake when there is no failure in the steering system, and switched off to interrupt the electric power supply to the motor and the brake when the steering system has failed;

a power transistor unit inserted in a line electrically connecting between the fail-safe relay and the motor and adapted to selectively drive the motor in one rotational direction or in the opposite rotational direction;

a first power-transistor driving circuit for driving the power transistor unit in a manner such that current is supplied from the electric power source to the motor so as to rotate it in one rotational direction;

a second power-transistor driving circuit adapted to operable alternatively with the first power-transistor driving circuit for driving the power transistor unit in a manner such that current is supplied from the electric power source to the motor so as to rotate it in the opposite rotational direction;

an electromagnetic-brake driving circuit for driving the electromagnetic brake for brake application when at least one of the sensors, the electric power source and the electrical connections between the sensors and the control unit or between the electric power source and the motor has failed; and a microcomputer electrically connected with the electric power source through a key switch and adapted to receive the output signals of the steering-wheel-condition sensor, the vehicle-speed sensor, the rear-wheel steering angle sensor and the motor-rotational speed sensor to detect whether or not the power steering system has failed and controlling the operations of the fail-safe driving circuit, the first and second power transistor driving circuits and the electromagnetic brake driving circuit in a manner such that the rear road wheels are appropriately steered under the action of the motor and the electromagnetic brake which are controlled by the first and second transistor circuits and the electromagnetic brake driving circuit if no failure is detected and the steering system is normally operating, whereas the fail-safe relay driving circuit is operated to switch off the fail-safe relay thereby to interrupt the supply of electric power to the motor and the electromagnetic brake so that the motor is stopped and the electromagnetic brake is actuated to lock the rear road wheels against steering when a failure is detected in any of the sensors, the electric power source and the electrical connections between the sensors and the control unit or between the electric power source and the motor.

It is preferred that the fail-safe relay comprise:

a pair of normally open contacts inserted in the power line connecting the electric power source with the motor and the electromagnetic brake; and a driving coil electrically connected through the key switch with the electric power source and adapted to be energized, upon closing of the key switch, to close the pair of contacts for supplying electric power from the electric power source to the electromagnetic brake and the motor in the normal operating condition of the power steering system so that the motor is driven to rotate and the electromagnetic brake is deactuated, whereas the driving coil is deenergized by opening of the key switch or by the fail-safe relay driving circuit when the microcomputer detects that there is a failure in any of the sensors, the electric power source and the wiring electrically connecting between the sensors and the control unit or between the electric power source and the motor.

The above and other objects, features and advantages of the present invention will become apparent from the following detailed description of a presently preferred embodiment of the invention when taken in conjunction with the accompanying drawings.

DESCRIPTION OF THE PREFERRED EMBODIMENT

Figure 1:
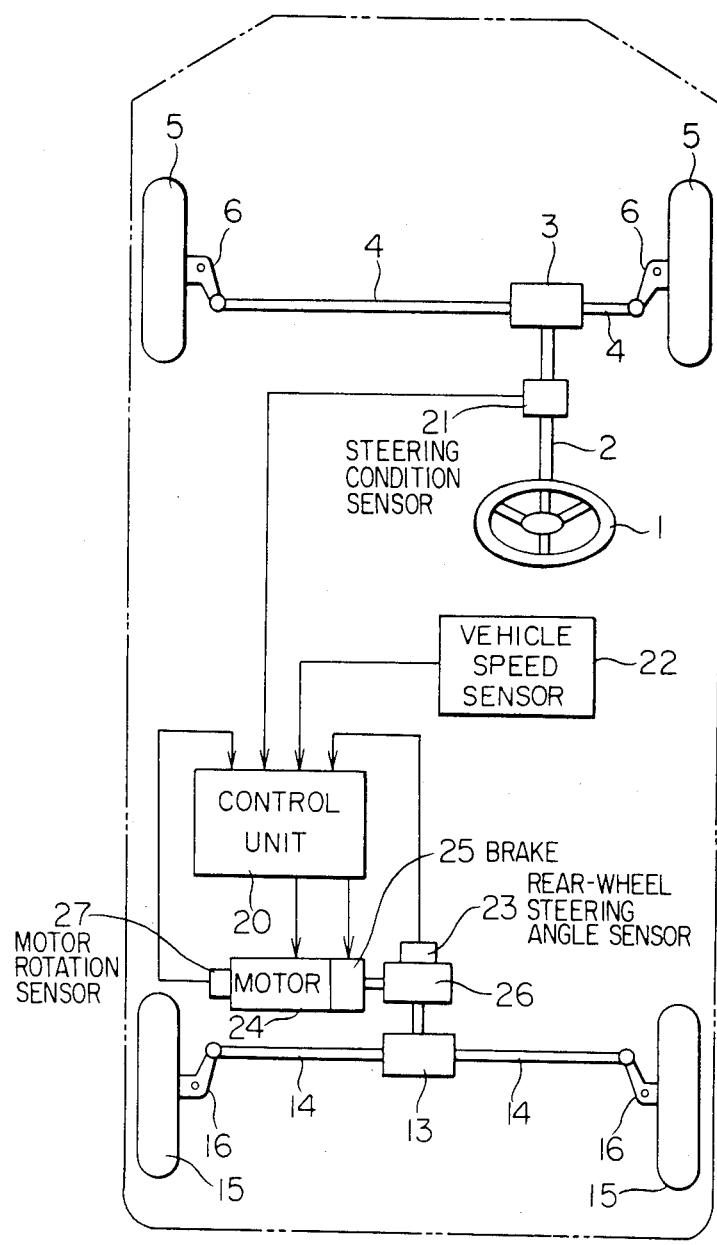
FIG. 1 is a schematic view showing a motor-driven power steering system for front and rear road wheels constructed in accordance with the present invention.

The present invention will now be described in detail with reference to one embodiment thereof as illustrated in the drawings.

Referring first to FIG. 1, there is schematically illustrated the general arrangement of a motor-driven power steering system for front and rear road wheels in accordance with the present invention. The power steering system illustrated includes a steering wheel 1; a steering shaft 2 connected at its one end with the steering wheel 1 and at its other end with a front tie rod 4 for front wheel steering through a front-wheel steering gear 3 incorporating therein a movement-direction changing mechanism such as a rack and pinion mechanism, the front tie rod 4 being connected at its opposite ends with a pair of front road wheels 5 through a pair of knuckle arms 6, respectively; a rear-wheel steering gear 13 incorporating therein a movement-direction changing mechanism such as a rack and pinion mechanism including a rack 13a and a pinion 13b in mesh with each other; a rear tie rod 14 connected at its opposite ends with a pair of rear road wheels 15 through a pair of knuckle arms 16 for steering the rear road wheels 15, respectively; an electric motor 24 operatively connected with the rear tie rod 14 through a speed reduction gear 26 and the rear-wheel steering gear 13 so that the power steering force of the electric motor 24 is transmitted through the speed reduction gear 26 to the rear tie rod 14 so as to power steer the rear road wheels 15, the speed reduction gear 26 having therein a movement-direction changing mechanism such as a worm 26a operatively connected with the rotary shaft of the motor 24, and a worm wheel 26b in meshing engagement with the worm 26a and connected with the pinion 13b of the rear-wheel steering gear 13 (FIG. 2); an electromagnetic brake 25 of a non-electromagnetically actuated type interposed between the electric motor 24 and the speed reduction gear 26 and associated with one end of the rotary shaft of the motor 24 so that it is actuated to brake the rotation of the electric motor 24 when electric power supply to the brake 25 is interrupted; a rear-wheel steering angle sensor 23 for detecting the rotational angle of the speed reduction gear 26 after speed reduction; a motor rotation sensor 25 connected with the other end of the motor rotary shaft for detecting the rotational direction and the rotational speed of the motor 24; and a steering condition sensor 21 associated with the steering shaft 2 for detecting at least one of the steering conditions of the steering wheel 1 such as the steering direction, the steering angle, the steering torque, the steering speed and the like; a vehicle speed sensor 22 for detecting the travelling speed of the vehicle; and a control unit 20 adapted to receive the output signals of the steering condition sensor 21, the vehicle speed sensor 22, the rear-wheel steering angle sensor 23, and the motor rotation sensor 27 to generate an output signal for controlling the operations of the motor 24 and the electromagnetic brake 25 on the basis of the information obtained from the above output signals.

Figure 2:
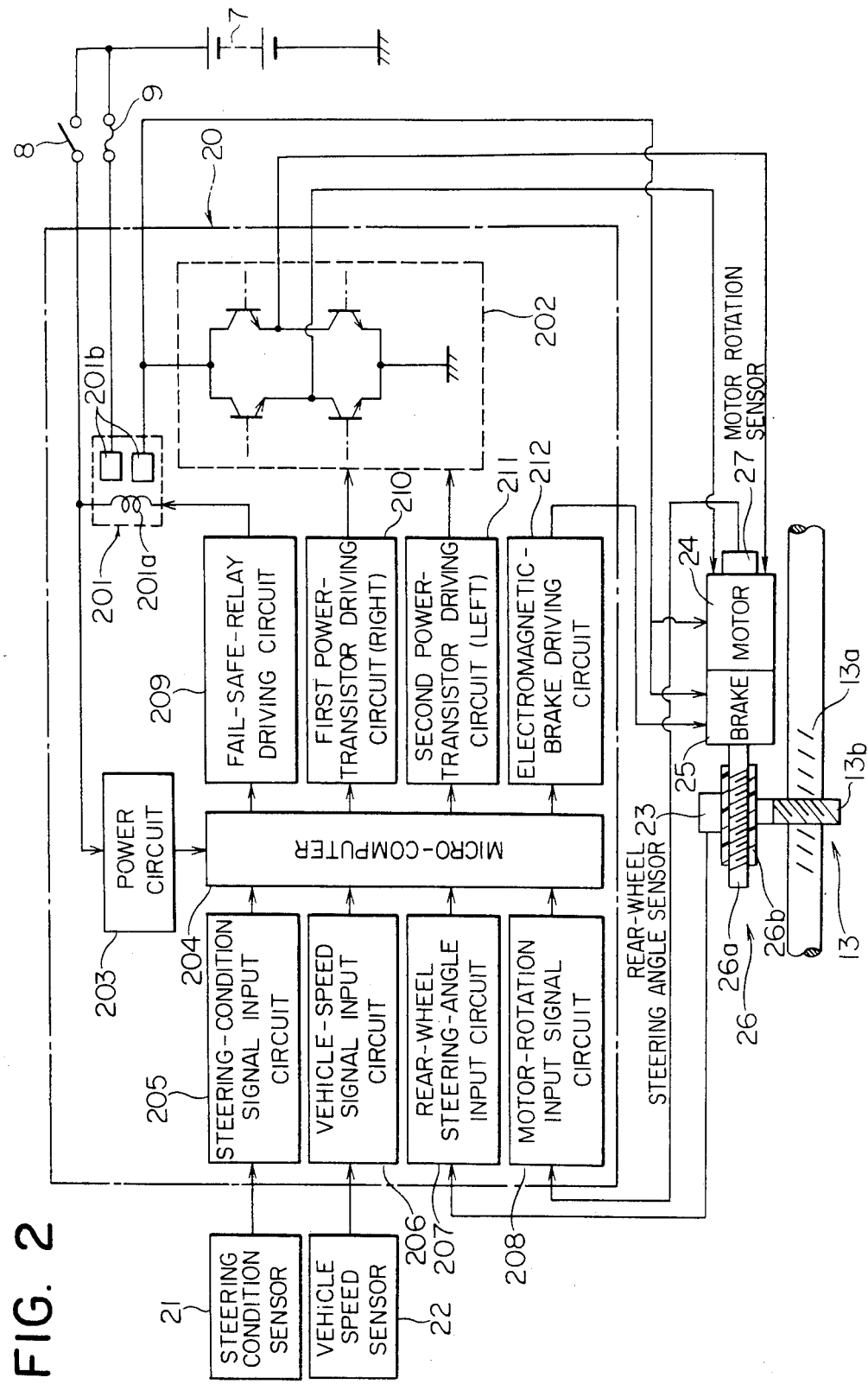
FIG. 2 is a diagrammatic view showing a control unit for use with the motor-driven power steering system illustrated in FIG. 1.

FIG. 2 illustrates the details of the control unit 20. As seen from FIG. 2, the control unit 20 includes a fail-safe relay 201 having a driving coil or solenoid 201a electrically connected through a key switch 8 with an electric power source 7 in the form of a battery, and a pair of normally open contacts 201b one of which is electrically connected through a fuse 9 with the battery 7, the other contact being electrically connected with the motor 24 and the electromagnetic brake 25; a power transistor unit 202 inserted in a line connecting between the fail-safe relay 201 and the motor 24 and adapted to change the direction of voltage imposed on the motor 24; a power circuit 203 electrically connected through the key switch 8 with the battery 7; a steering-condition signal input circuit 205 adapted to be operable as an input I/F circuit for converting the output signal of the steering-condition sensor 21 representative of at least one of the steering conditions of the steering wheel 1 such as the steering direction, the steering angle, the steering torque, the steering speed and the like into an appropriate input signal; a vehicle-speed signal input circuit adapted to form an input I/F for the vehicle speed signal from the vehicle speed sensor 22; a rear-wheel steering-angle signal input circuit 207 adapted to form an input I/F circuit for the rear-wheel steering-angle signal from the rear-wheel steering angle sensor 23; a motor-rotation signal input circuit adapted to form an input I/F circuit for the motor rotation signal from the motor rotation sensor 27; a fail-safe relay driving circuit 209 for selectively establishing or interrupting the power supply to the drive circuit 201a of the fail-safe relay 201; a first power-transistor driving circuit 210 adapted to drive the power transistor unit 202 in a manner such that the motor 24 rotates in a clockwise direction; a second power-transistor driving circuit 211 adapted to drive the power transistor unit 202 in a manner such that the motor 24 rotates in a counter-clockwise direction; an electromagnetic-brake driving circuit 212 adapted to control the operation of the electromagnetic brake 25 in an on-off manner; and a microcomputer 204 electrically connected with the power circuit 203 and adapted to receive the output signals of the steering-wheel-condition sensor 21, the vehicle speed sensor 22, the rear-wheel steering angle sensor 23 and the motor rotation sensor 27 through the respective signal input circuits 205 through 208. The microcomputer 204 judges whether or not the power steering system has failed and controls the operations of the fail-safe driving circuit 209, the first and second power transistor driving circuits 210, 211 and the electromagnetic-brake driving circuit in a manner such that the rear road wheels 15 are appropriately steered under the action of the motor 24 and the electromagnetic brake 25 which are controlled by the first and second power-transistor driving circuits 210, 211 and the electromagnetic-brake driving circuit 212 if it is judged that the steering system is normally operating, whereas the fail-safe relay driving circuit 209 is operated to switch off the fail-safe relay 201 thereby to interrupt the supply of electric power to the motor 24 and the electromagnetic brake 25 so that the motor 24 is stopped and the electromagnetic brake 25 is actuated to lock the rear road wheels 15 against steering if it is judged that there is a failure in any of the sensors 21 through 23 and 27, the battery 7 and wiring connecting between the sensors and the control unit 20 or between the battery 7 and the motor 24.

In operation, when the steering wheel 1 is turned to the right (in a clockwise direction) or to the left (in a counter-clockwise direction), the steering torque imparted to the steering wheel 1 by the operator is transmitted through the steering shaft 2 to the front-wheel gear 3 wherein the rotary motion is converted into a rectilinear motion, thereby driving the front tie rod 4 in a direction transverse of the vehicle body to steer the front road wheels 5 to the right or left through the intermediary of the knuckle arms 6. In this case, the steering condition sensor 21 associated with the steering shaft 2 acts to detect at least one of the steering-conditions of the steering wheel 1 such as the steering direction, the steering angle, the steering torque, the steering speed, and the like and sends out a steering condition signal representative of at least one of the detected steering conditions to the control unit 20 which, in addition to the output signal of the steering sensor 21, is input with a vehicle speed signal from the vehicle speed sensor 22, and a rear-wheel steering angle signal from the rear-wheel steering angle sensor 23 so as to calculate an optimal rear wheel steering angle most suited to the respective conditions on the basis of which the motor 24 and the electromagnetic brake 25 are properly operated to control the rear road wheels 15 to give an intended steering angle.

More specifically, when the microcomputer 204 judges that there is no failure in the steering system, the contacts 201b of the fail-safe relay 201 are closed so that the electromagnetic brake 25 is supplied with electric power from the battery 7 through the fail-safe relay 201 to release the brake application, and subsequently, the motor 24 is also supplied with electric power from the battery 7 through the fail-safe relay 201 and the power transistor unit 202 so as to rotate clockwise or counterclockwise under the control of the first and second power-transistor driving circuits 210, 211. Then, a motor rotation signal is fed back through the motor rotation sensor 27 to the control unit 20, and at the same time, due to the release of the electromagnetic brake 25, the rotational force of the motor 24 is transmitted to the speed reduction gear 26 where the transmitted rotational speed is reduced and the direction of movement is convertd from a rotary motion into a rectilinear motion, and then the force is further transmitted therefrom to the rear-wheel gear 13. Simultaneous with this, the output signal of the rear-wheel steering angle sensor 23 is fed back to the control unit 20. The rectilinear force thus converted from the rotary motion by the rear-wheel gear 13 is given to the rear tie rod 14 to steer the rear road wheels 15 to the right or left through the intermediary of the knuckle arms 16. When the steering angle of the rear road wheels 15 thus steered comes to match the rear wheel steering angle dictated by the control unit 20, the operation of the motor 24 is stopped. The above-described operations are repeated until the rear road wheels 15 are controlled to an intended angle determined by a certain function with respect to the steering angle of the front road wheels 5.

The operation of the control unit 20 will now be described in detail with reference to FIG. 2. When the key switch 8 is turned on, electric power is supplied from the battery 7 to the microcomputer 204 through the key switch 8 and the power circuit 203 to actuate the microcomputer 204. At this time, the respective output signals of the steering condition sensor 21, the vehicle speed sensor 22, the rear-wheel steering angle sensor 23 and the motor rotation sensor 27 are input to the microcomputer 204 through the steering-condition signal input circuit 205, the vehicle-speed signal input circuit 206, the rear-wheel steering-angle signal input circuit 207, and the motor-rotation signal input circuit 208, respectively. On the basis of the various information input from the respective sensors, the microcomputer 204 recognizes the conditions of the front and rear road wheels 5 and 15, the travelling speed of the vehicle, and the rotational speed of the motor 24 (or the steering speed for the rear road wheels 15), and calculates the intended steering angle of the rear road wheels 15, and judges whether or not the fail-safe operation is required. If there is a difference between the intended rear wheel steering angle set as a result of the calculation of the microcomputer 204 and the actual steering angle of the rear road wheels 15 detected by the rear-wheel steering angle sensor 23, the microcomputer 204 sends out an instruction signal to the power transistor driving circuit 210 or 211 such that the motor 24 is caused to rotate in a direction to offset such a difference, and thus the first or second power-transistor driving circuit 210 or 211 is actuated or turned on. As a result, the transistor unit 202 is driven into a conductive state by means of the power transistor driving circuit 210 or 211, and the fail-safe relay 201 is driven to close the normally open contacts 201b by the fail-safe relay driving circuit 209 as long as the microcomputer 204 judges that the entire power steering system is normal, so that electric power is supplied from the battery 7 to the motor 24 via the fuse 9, the closed normally-open contacts 201b and the power-transistor unit 202 to energize the motor 24 whereby the motor 24 is caused to rotate in a clockwise direction or in a counter-clockwise direction to steer the rear road wheels 15 to the right or left through the worm 26a, the worm wheel 26b, the pinion 13b and the rack 13a. On the other hand, when the difference between the intended steering angle and the actual steering angle of the rear road wheels 15 is offset in this manner, the microcomputer 204 acts to interrupt the first or second power-transistor driving circuit 210 or 211 to stop the motor 24. The above-described operations are repeated so as to control the rear road wheels 15 to an intended steering angle in accordance with a certain function with respect to the steering angle of the front road wheels 5.

If, however, the rear road wheels 15 become uncontrollable irrespective of the inputs of the operator due to trouble or failure in the various sensors 21 through 23 and 27, or breakage in the wiring connecting between the sensors and the control unit 20, the microcomputer 204 determines the occurrence of such trouble or failure, and sends out an interruption signal to the fail-safe relay driving circuit 209 so that current supply to the driving coil 201a of the fail-safe relay 201 is interrupted to open the normally open contacts 201b. Accordingly, the current supply to the motor 24 and the electromagnetic brake 25 is interrupted to stop the motor 24 and actuate the electromagnetic brake 25 so that the worm 26a is braked by the electromagnetic brake 25 to fix the worm wheel 26b engaged therewith, the pinion 13b connected with the worm wheel 26b and the rack 13a, thereby locking or fixing the rear road wheels 15 at their failed positions against steering thereof. After the fail-safe operation has started in this manner, the entire steering system is put into a front-wheel steering mode so that the vehicle can continue to travel with the front wheel steering alone as in the case of a conventional automotive vehicle equipped with a conventional front wheel steering system. As a result, any possible dangerous situation can be substantially minimized or avoided. Also, in cases where there is a failure or breakage of electric circuits for connecting the motor 24 and the electromagnetic brake 25 to the battery 7 through the power transistor unit 202, or the normally open contacts 201b and the fuse 9, the rear road wheels 15 are likewise locked or fixed against steering at the starting point of the fail-safe operation.

As described in the foregoing, according to the present invention, an electromagnetic brake, which is actuated upon deenergization thereof, is provided for braking a rear-wheel steering motor, and a fail-safe relay having a pair of normally open contacts is interposed in a power line electrically connecting between an electric power source and the motor or between the electric power source and the electromagnetic brake. On the basis of the information obtained from various sensors, a control unit determines whether or not a rear wheel steering system has failed. If it is determined that the rear wheel steering system has failed, a fail-safe relay is turned off to interrupt the electric supply to the motor and the electromagnetic brake under the control of the control unit so that the motor is stopped and the electromagnetic brake is actuated to lock the steering motion of the rear road wheels, thereby preventing any possible uncontrolled steering of the vehicle which would otherwise result from abnormal motions of the rear road wheels at the time of trouble or failure of the sensors and/or the control unit or breakage of the wiring electrically connecting therebetween, and at the same time enabling the vehicle to continuously travel in a stable and safe manner after occurrence of such trouble or failure.

What is claimed is:

1. A motor-driven power steering system for front and rear road wheels of a vehicle adapted to provide a fail-safe steering operation, said power steering system comprising:

a motor electrically connected to receive current from an electric power source and mechanically connected to transmit a force to steer the rear road wheels;

a steering condition sensor electrically connected to detect at least one of a plurality of steering conditions of a steering wheel connected to the front wheels, such as direction, steering angle, steering torque, and steering speed, and generating an output signal representative thereof;

a vehicle speed sensor electrically connected to detect travelling speed of the vehicle and generating an output signal representative thereof;

a motor rotation sensor electrically connected to detect rotational direction and rotational speed of said motor and generating an output signal representative thereof;

a rear-wheel steering angle sensor electrically connected to detect steering angle of the rear road wheels and generating an output signal representative thereof;

an electromagnetic brake electrically connected to the power source and operable independently of said motor to lock steering motion of said rear road wheels when the electrical power is disconnected from said electromagnetic brake; and a control unit connected to receive the output signals of said sensors and operable to disconnect the power supply to said motor and said electromagnetic brake, responsive to failure of any one of said sensors and electrical connections of said system, so as to lock the rear wheels against steering while allowing the vehicle to be steered by the steering wheel through the front wheels.

2. A motor-driven power steering system for front and rear road wheels of a vehicle according to claim 1 wherein said control unit comprises:

a fail-safe relay electrically connected to the electric power source, said motor, and said electromagnetic brake to establish, when switched on, electrical connection therebetween, and to interrupt the electrical connections when switched off;

a fail-safe relay driving circuit connected to switch said fail-safe relay on and off in a manner such that said fail-safe relay is switched on to supply electric power to said motor and said brake when there is no failure in said steering system and switched off to interrupt the electrical power supply to said motor and said brake when any one of said sensors and electrical connections of said steering system has failed;

a power transistor unit electrically connected between said fail-safe relay and said motor to selectively drive said motor in a first rotational direction or in a second rotational direction opposite thereto;

a first power-transistor driving circuit electrically operating said power transistor unit to drive said motor in the first rotational direction;

a second power-transistor driving circuit electrically operating said power transistor unit to drive said motor in the second rotational direction;

an electromagnetic-brake driving circuit operating said electromagnetic brake to stop the steering motion of the rear road wheels when at least one of said sensors and electrical connections has failed; and a microcomputer connected to receive the output signals of said steering condition sensor, said vehicle speed sensor, said rear-wheel steering angle sensor, and said motor rotation speed sensor and including means for judging whether or not a failure has occurred in any one of said sensors and said electrical connections of said power steering system and for controlling operations of said fail-safe driving circuit, said first and second power transistor driving circuits, and said electromagnetic brake driving circuit in such a manner that the rear road wheels are appropriately steered by the force transmitted thereto from said motor when no failure is judged to have occurred and said steering system is operating normally, and for controlling operations of said fail-safe relay driving circuit to switch off said fail-safe relay to interrupt the supply of electric power to said motor and said electromagnetic brake so that said motor is stopped and said electromagnetic brake is actuated to lock said rear road wheels against steering when a failure is judged to have occurred in any of said sensors and electrical connections of said system.

3. A motor-driven power steering system for front and rear road wheels according to claim 2 wherein said fail-safe relay comprises:

a pair of normally open contacts; and a driving coil electrically connected with said electric power source and adapted to be energized to close said pair of contacts and supply electric power from said electric power source to said electromagnetic brake and said motor when said power steering system is operating normally so that said motor is driven to rotate and said electromagnetic brake is deactuated and adapted to be deenergized to open said pair of contacts and interrupt electric power from said electric power source to said electromagnetic brake and said motor when said microcomputer judges that a failure has occurred in any of said sensors and electrical connections of said system.

4. A motor-driven power steering system for front and rear road wheels according to claim 2 wherein said control unit further comprises:

a steering-wheel-condition signal input circuit through which the output signal of said steering-wheel condition sensor is input to said microcomputer;

a vehicle-speed signal input circuit through which the output signal of said vehicle-speed sensor is input to said microcomputer;

a rear-wheel steering-angle signal input circuit through which the output signal of said rear-wheel steering angle sensor is input to said microcomputer;

a motor-rotation signal input circuit through which the output signal of said motor rotation sensor is input to said microcomputer; and a power circuit through which said microcomputer is electrically connected with said electric power source.

* * * * *